3,644,635
METHOD AND COMPOSITIONS FOR INHIBITING MICROBIAL GROWTH

Bryce E. Tate, Ninantic, and Robert P. Allingham, Groton, Conn., assignors to Pfizer Inc., New York, N.Y.
No Drawing. Continuation-in-part of application Ser. No. 310,141, Sept. 19, 1963. Division of application Ser. No. 591,126, Nov. 1, 1966. This application Apr. 10, 1969, Ser. No. 834,922
Int. Cl. A01n 9/28
U.S. Cl. 424—283      5 Claims

ABSTRACT OF THE DISCLOSURE

Inhibiting the growth of bacteria and fungi by applying to their locus certain 2-alkenylpyromeconic acids.

---

This application is a division of the copending application Ser. No. 591,126, filed Nov. 1, 1966.

The present invention is in part a continuation of copending application Ser. No. 310,141, filed Sept. 19, 1963, now abandoned. The application Ser. No. 591,126, filed Nov. 1, 1966, has issued as U.S. Patent No. 3,468,916.

This invention relates to new and valuable organic compounds and to their use as flavor and aroma enhancers for edibles, aroma enhancers for perfumes and as antimicrobial agents. More particularly, it is concerned with the process for the improvement of the flavor and aroma of foods and beverages and the aroma of perfumes which comprises the addition of 2-alkenyl-pyromeconic acid to such foods, beverages and perfumes. This invention also concerns the method for inhibiting the growth of microbes which comprises the addition of 2-alkenylpyromeconic acids to the locus of said microbes.

The 2-alkenylpyromeconic acids of this invention are those having the formulae:

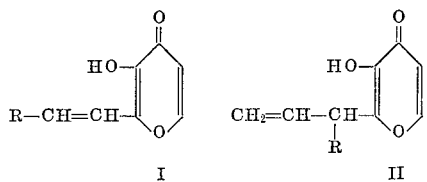

where R is hydrogen or alkyl having from 1 to about 6 carbon atoms.

The compounds of structure I are prepared by a modification of the process disclosed and claimed in U.S. Patent 3,130,204 and issued to Bryce E. Tate and Robert L. Miller. They are prepared by reacting pyromeconic acid with an aldehyde and thereafter dehydrating the intermediate 2-(1-hydroxyalkyl)pyromeconic acid which results. The process is carried out according to the following sequence:

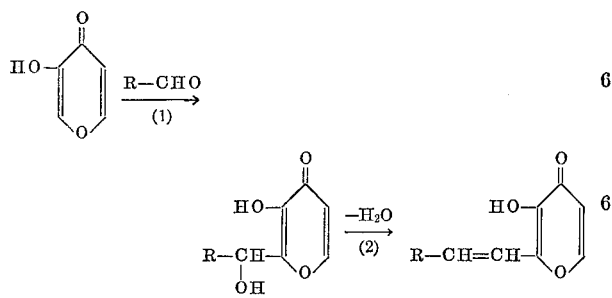

The conversion of pyromeconic acid to 2-(1-hydroxyalkyl) pyromeconic acid is accomplished by carrying out step (1) at a pH of above about 5 and preferably above about 8. While the addition of the aldehyde is most conveniently accomplished by adding the aldehyde to the pyromeconic acid in aqueous solution, dioxane has been found to be a useful solvent for the aldehyde in this step. Bases such as sodium hydroxide, potassium hydroxide, lithium hydroxide and the like can be used for bringing the pH of the reaction mixture to above at least 5. For optimum yields, it is preferred to limit the amount of aldehyde added to one mole equivalent based on the pyromeconic acid. The use of an excess of aldehyde may decrease the purity of the produce if an aqueous medium is employed. The dehydration step (2), as will be exemplified, may be carried out simply by heating, although it is preferred to carry out such heating in the presence of a small amount of acid and it is especially preferred to employ p-toluenesulfonic acid to promote the dehydration.

The following represents a preferred embodiment of step (1) in the sequence: Pyromeconic acid is added to about 4 times its weight of water and to the desired mixture is added sufficient 50% by weight aqueous base solution to bring the pH of the resulting mixture to about 10. To this solution is added one mole equivalent of the appropriate aldehyde dissolved in minimum volume of dioxane. The resulting mixture is stirred at 50° C. for about 18 hours, then is cooled and adjusted to pH 2 with strong acid. Cooling the reaction mixture to about 5° C. causes the desired product to precipitate, in crystalline form, from the reaction mixture, from which it is recovered by filtration.

With respect to step (2), the dehydration of the 2-(1-hydroxyalkyl) pyromeconic acids to form the 2-alkenyl-pyromeconic acid, a preferred embodiment is as follows: The hydroxy compound is suspended in about 10 times its weight of toluene and an amount of p-toluenesulfonic acid equivalent to about 1/100 part by weight based on the hydroxy compound, is added. The mixture is refluxed under azeotropic distillation conditions until water ceases to evolve; this usually requires about 1.5 hours. The hot mixture is filtered, then cooled and the solvent is evaporated. The alkenyl compound, which remains as a residue can be further purified by recrystallization from a solvent such as cyclohexane.

Since the compounds contemplated by the instant invention contain acidic hydrogen, it is intended to include within this invention metal salts of the compounds in addition to the free acids. These salts are formed in the usual manner, for example, by reacting the new compounds with a base, such as alkali metal hydroxides, alkaline earth metal hydroxides or an organic base. Especially useful salts are those of sodium, potassium, calcium and ammonia.

The 2-allylpyromeconic acid and the 2-propenylpyromeconic acids were reported in Croatica Chemica Acta, vol. 33, pages 229–233 (1961). The higher homologues of structure (II) are prepared by procedures analogous to those for 2-allylpyromeconic acid.

Broadly, this invention includes 2-vinylpyromeconic acid and the method for inhibiting microbial growth which comprises applying to such microbes an inhibiting concentration of a 2-alkenylpyromeconic acid having the formulae:

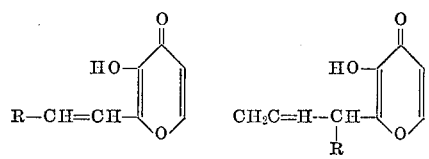

where R is hydrogen or alkyl having from 1 to about 6 carbon atoms.

Furthermore, this invention includes aforesaid method wherein said inhibiting concentration is from about 2 to about 10,000 parts per million by weight.

Also included in this invention are antimicrobial compositions comprising one of the aforesaid compounds and a carrier.

This invention also includes the method of enhancing the aroma of edibles and perfumes and the flavor of edibles which comprises adding an effective amount of one of the aforesaid compounds thereto.

Furthermore, this invention includes the aforesaid method of enhancing the aroma of edibles and perfumes wherein said effective amount is from about 1 to about 500 parts per million by weight.

The invention further includes edibles and perfume compositions containing as a flavor or as an aroma agent one of the aforesaid 2-alkenylpyromeconic acids.

The present invention contemplates a process for controlling the growth of microbes. It has been found that 2-alkenylpyromeconic acids prepared as described hereinbefore have valuable antimicrobial properties. These properties are particularly valuable since it is a matter of common knowledge and experience that uncontrolled microbial growth is responsible for serious economic losses through food damage and in numerous instances of diseases in man and in animals. In the past, it has been proposed to add many chemical agents to foods or to other substances to prevent the destruction thereof by the uncontrolled growth of microbes therein. Furthermore, infections in humans and animals have been controlled by the administration of certain substances in microbe-controlling concentrations to the infected host. In addition, microbe-controlling agents have been employed in medical diagnostic techniques and in industrial processes where it is necessary to control the growth of undesirable microbes. The 2-alkenyl pyromeconic acids possess a high order of activity as microbe-controlling agents, and as a consequence, since small amounts can be used, offer a substantial economy in comparison with many previously employed chemical agents. 2-vinylpyromeconic acid, contemplated by the instant invention is especially active in this process.

The process for controlling microbial growth contemplates the addition of the compound either in the solid form or, alternatively, dissolved in solution or in forms ordinarily used for pharmaceutical preparations. These preparations contain the compound, if desired, in the form of a salt thereof, in admixture with a pharmaceutical organic or inorganic carrier suitable for local administration. For making the carriers there are used substances that do not react with the said 2-alkenylpyromeconic acid, for example, water, gelatin, lactose, starches, magnesium stearate, talc, vegetable oils, benzyl alcohol, gums polyalkylene glycols, white petrolatum or other known carriers or medicaments. The pharmaceutical preparations may be in the form of powders, salves, or creams in liquid forms as solutions, suspensions, or emulsions. If desired, they may be sterilized and/or may contain auxiliary substances such as preserving, stabilizing, wetting or emulsifying agents.

If it is desired to use the new process in the preservation of materials such as, for example, foods, the 2-alkenylpyromeconic acid may be incorporated into the food by any common technique employed by those skilled in the art. For example, if it is desired to control microbial growth in baked goods such as bread, the acid may be mixed with the dough, may be sprinkled on the surface of said bread or may be incorporated into the bread wrapping to provide the desired microbial effect.

By the term microbe inhibiting concentration used herein and in the appended claims, is contemplated levels of from about 2 to several thousand parts per million by weight. The effective ranges will depend on the microbe in question. In general, the low toxicity of the compounds allows large concentrations to be used where necessary.

With respect to enhancing the aroma and flavor of edibles, particular mention is made of the especially desirable increase in appeal which is obtained when 2-alkenylpyromeconic acids are added in an amount to provide from about 1 to about 500 parts per million by weight. It is observed that below about 1 part per million there is a tendency for some people to have difficulty in discerning the beneficial effect of the addition and that above about 500 p.p.m. some begin to notice an aroma effect contributed by the 2-alkenylpyromeconic acid itself. It is obvious to those skilled in the art to which this subject matter pertains that for varying purposes varying amounts are required, and these levels may be determined by experimentation. Thus, in some products the test subjects have difficulty in discerning 5 p.p.m. and also in some products less desirable effects are observed above about 500 p.p.m. With respect to enhancing the aroma of perfumes, generally the same levels of 2-alkenylpyromeconic acid, as in food, can be employed. As will be understood by those skilled in the art, the precise amount of 2-alkenylpyromeconic acid to be added will depend on the desired strength of the perfume odor itself. It is found that these acids have a slightly-sweet, floral odor and contribute this odor to perfumes giving them a longer-lasting effect. In addition it has been found that the addition of the compounds to perfumes strengthens the aroma of the perfume.

With respect to the term edibles, used herein and in the appended claims, it is contemplated to include compositions which are ordinarily eaten or drunk. For example, 2-alkenylpyromeconic acids are particularly effective in enhancing the flavor and aroma of chocolate and vanilla products, candies, ice cream, cake mixes, cookies, pies, desserts, fruit juices, wines, liqueurs and flavor extracts. Furthermore, they can be used as flavor and aroma components in canned and frozen fruits and vegetables, meat and fish products, cereals, macaroni and noodle products, soups, sauces and seasonings, prepared dressings, and breads. In addition, among the edibles which can be benefited by the process of the instant invention are pharmaceutical oral dosage forms, animal feeds and pet foods. With respect to the term perfumes, as used herein and in the appended claims, it is meant to include concentrated essences, colognes, and industrial odorants which are commonly used in cosmetic and hygienic products, such as detergents and soaps, and in the perfuming of tobacco, paper, textiles, printing inks, food packages, paints, home deodorants and insecticides.

2-alkenylpyromeconic acids, at very low levels, strengthen the flavor and aroma of a wide variety of products. 2-vinylpyromeconic acid is considerably more potent than the remaining acids in this regard. They develop inherent flavors and create, especially in sweet foods, a "velvet mouth sensation." Because they so strongly augment many inherent flavors, as for instance, that of chocolate, product reformulation may be required in some instances to achieve optimum taste; these reformulations are well within the capability of those skilled in the art. 2-alkenylpyromeconic acids may be added to the food or perfume directly in the dry form or, alternatively, as a solution. Care should be taken to obtain even distribution through the use of pre-mixing if necessary, since such small quantities have such a powerful effect.

By the term pharmaceutically-acceptable alkali addition salts in the appended claims is meant to include the alkali metals, alkaline earth metals and ammonium salts. The more common alkali metals include sodium, and potassium. The alkaline earth metals included are those of atomic number up to and including 20, i.e., magnesium and calcium, and additionally, aluminium, zinc, iron and manganese, among others.

EXAMPLE I 2-vinylpyromeconic acid

In an 8-liter stainless steel vessel fitted with a stirrer and an air sparger is placed a suspension of 350 grams of kojic acid in 3500 ml. of water. The pH is adjusted to 11.1 by addition of 256 ml. of 50% aqueous sodium hydroxide and then 142 g. (7.1 g. as metal) of a 5% palladium on charcoal catalyst is added. Air is passed into the suspension at a rate of about 2100 ml. per minute. The reaction, which is slightly exothermic, is maintained at a temperature of about 20–22° C. by occasional application of external cooling. After 11 hours the reaction mixture is filtered to remove the catalyst and is treated with 600 ml. of concentrated hydrochloric acid. The crystals of comenic acid which precipitate from the pH 0.5 mixture are removed by filtration, washed with a small amount of cold water and are air-dried. There is obtained 328 g. of product. This is 85.3% of the theoretical yield. Titration data indicate the product to be 99.2% pure; therefore, there is obtained an 84.6% yield of comenic acid as corrected for purity.

In a 150-ml. Pyrex flask fitted with a mechanical stirrer and a thermometer and connected through a distillation head to a receiver are placed 10.0 g. of comenic acid prepared as described and 30 ml. of diphenyl ether. The reaction mixture is stirred and heated by application of a heating mantle. After about 20 minutes, the temperature reaches 225° C. and gas is observed to pass into the receiver. When the temperature reaches 245–250° C., a vigorous evolution of carbon dioxide is observed. After an additional 40 minutes at 245–250° C., the pyromeconic acid is distilled therefrom until no more passes over at an internal temperature of 255° C. and a vapor temperature of 230° C. Thirty ml. of additional diphenyl ether is added to the reaction flask and a second fraction is obtained after distillation at 255° C. internal temperature for an additional 1 hour and 10 min. The product is suspended in about 5 volumes of hexane, then is removed by filtration, and is recrystallized in 4 volumes of toluene. There is obtained 5.71 g. of pyromeconic acid, M.P. 113–115.5. Concentration of the toluene mother-liquors to about 1/20 volume affords an additional 0.7 g. of somewhat less pure pyromeconic acid. The combined weight of pyromeconic acid obtained represents an 80% conversion.

Pyromeconic acid (448 g., 4.0 moles) is mixed with 1.5 l. cold water, the pH of the mixture was adjusted to 10.5 by the addition of 50% sodium hydroxide solution, and the resulting solution was cooled to 17° C. A solution of acetaldehyde (193.6 g., 4.4 moles) in 320 cc. of ice water is added with stirring and the mixture is allowed to stand at ambient temperature for 20 hours. The solution is acidified with 50% sulfuric acid, cooled, and allowed to crystallize. Filtration affords 492 g. (79%) of 2-(1-hydroxyethyl) pyromeconic acid, M.P. 129–130° C. An additional crop (31.5 g., 5.5%) is obtained from the mother liquor. Recrystallization of the main crop twice from isopropanol yields analytically pure material, M.P. 131–132° C.

*Analysis.*—Calc'd for $C_7H_8O_4$ (percent): C, 53.85; H, 5.17. Found (percent): C, 54.01; H, 5.31.

2-(1-hydroxyethyl) pyromeconic acid, 15.6 g., 0.1 mole, p-toluenesulfonic acid, 0.16 g., and 150 ml. of toluene are placed in a 250 ml. flask equipped with a magnetic stirrer and an azeotropic water separator. The mixture is heated under reflux for 90 minutes during which time 1.2 ml. of water is collected. The hot solution is filtered, is allowed to cool and is refiltered. Evaporation of the filtrate and crystallization of the residue from cyclohexane affords 1.82 g. of 2-vinylpyromeconic acid, M.P. 110–113° C.

*Analysis.*—Calc'd for $C_7H_6O_3$ (percent): C, 60.87; H, 4.38. Found (percent): C, 60.56; H, 4.46.

EXAMPLE II 2-vinylpyromeconic acid was tested against several microorganisms in Witkin synthetic medium and found to have a minimum inhibitory concentration (mcg./ml.) of 0.39 against *Salmonella typhosa* and *E. coli* and 0.78 against *P. vulgaris* and *A. aerogenes*, respectively. In tissue culture, 2-vinylpyromeconic acid demonstrated activity against vaccinia virus. It also inhibited the growth of Staphylococcus in milk at 100 and at 10 micrograms per milliliter.

EXAMPLE III

When 2-vinylpyromeconic acid is dissolved in a floral base cologne to provide 1, 10, 100, 250 and 500 p.p.m. resepectively, and the odors of the resulting perfume compositions are determined and compared with that of the untreated perfume as a control, the aromas of the 2-vinylpyromeconic acid-containing perfumes are significantly enhanced.

EXAMPLE IV

When 2-vinylpyromeconic acid alone is added to a perfume base solvent at 10 p.p.m. When the mixture is sprayed into an area it proviedes a pleasant tropical fruit-like aroma.

EXAMPLE V

When the procdeure of Example I is repeated, replacing acetaldehyde with the aldehydes of Table I, the products of Table I are obtained.

Table I

| Aldehyde | Product |
|---|---|
| R—CHO | R—CH=CH— (attached to HO-pyranone ring) |
| R | R |
| $CH_3$—$CH_2$— | $CH_3$— |
| $CH_3$—$CH_2$—$CH_2$— | $CH_3$—$CH_2$ |
| $CH_3$<br>\\<br>$CH$—$CH_2$—<br>/<br>$CH_3$ | $CH_3$<br>\\<br>$CH$—<br>/<br>$CH_3$ |
| $CH_3$—$(CH_2)_5$— | $CH_3$—$(CH_2)_4$— |

These compounds are effective in controliIng the growth of a number of bacteria, yeasts and fungi. For example, 2-propenylpyromeconic acid (R—$CH_3$), in a Witkin synthetic medium, had a minimum inhibiting concentration, in micrograms per milliliter, of 1.56 against *Salmonella typhosa* and *P. vulgaris*; 0.78 against *E. coli*, and in a B—H infusion medium, an M.I.C. of 6.25 against *Past. multocoda*.

EXAMPLE VI 2-allylpyromeconic acid was tested in Witkin synthetic medium against several microorganisms and found to be effective in controlling their growth. The M.I.C. in micrograms per milliliter against *Salmonella typhosa*, *P. vulgaris* and *E. coli* was found to be 6.3 and against *A. aerogenes*, 50. In a B—H infusion, the M.I.C. was found to be 25 against *Strep. pyogenes*.

EXAMPLE VII

When the 2-propenylpyromeconic acid is added to a jasmine perfume base Table II, the floral note and tenacity of the aroma are improved.

TABLE II

| Perfume base: | Parts |
|---|---|
| Benzyl acetate | 40 |
| Linalcol | 10 |
| α-Amylcinnamic aldehyde | 10 |
| 2-propenylpyromeconic acid | 4 |
| Cinnamic alcohol | 5 |
| Phenylethyl alcohol | 5 |

Similar results are obtained when the compounds of Table III are used to replace the 2-propenylpyromeconic acid of Table II.

TABLE III.—PYROMECONIC ACIDS

| | |
|---|---|
| 2-vinyl- | 2-allyl- |
| 2-(1-butenyl)- | 2-(1-octenyl)- |
| 2-(1-pentenyl)- | 2-(1-methylallyl)- |
| 2-(1-hexenyl)- | 2-(1-propylallyl)- |
| 2-(1-isobutenyl)- | 2-(1-butylallyl)- |

When the jasmine perfume base is reduced to a 4 weight percent concentration (200 p.p.m. 2-alkenylpyromeconic acid) by the addition of ethyl alcohol, perfumes having intense odors are obtained. Similar pleasant and long-lasting odors are obtained from colognes made by further diluting the perfume base to a level of 2 weight percent by the addition of ethyl alcohol (100 p.p.m. 2-alkenylpyromeconic acid).

When a cold cream prepared by adding 5 grams of the perfume base to 25 grams of stearic acid, 5 grams wool fat, 1.5 grams triethanolamine, 9 ml. propylene glycol and 60 ml. of water, a pleasant cream is obtained having a tenacious odor.

EXAMPLE VIII

The flavor of a vanilla ice cream is pleasingly enhanced when the compounds of Example VII, Table III, are added at levels of 1 p.p.m. and at levels of 500 p.p.m. Similar results are obtained with 2-propenylpyromeconic acid.

EXAMPLE IX

The sodium salt of 2-vinylpyromeconic acid is prepared by dissolving one mole of the compound in a solution of sodium hydroxide (41 grams, 1.0 mole) in 100 ml. of water. To the solution is added 1500 ml. of acetone. The resulting precipitate of the sodium salt of 2-vinylpyromeconic acid is collected and dried.

In a similar manner, the sodium salts of the products of Table I, Example V and Table III, Example VII, are obtained. The potassium salts are prepared by replacing sodium hydroxide in the above-described procedure with potassium hydroxide and replacing acetone with isopropyl alcohol.

EXAMPLE X

The ferric salt of 2-vinylpyromeconic acid is prepared by dissolving 3.66 moles of ferric chloride (FeCl$_3$.6H$_2$O) in 8250 ml. of water and adding 11.0 moles of 2-vinylpyromeconic acid thereto. The mixture is heated to 65° C. and the pH is adjusted to 5.5 with 50% aqueous sodium hydroxide. The mixture is then stirred at ambient temperature for 1.5 hours with the pH being readjusted to 5.5. The mixture is cooled to 34° C. and stired at ambient temperature for 2.5 hours, cooled and filtered. The solid precipitate of the ferric salt of 2-vinylpyromeconic acid is obtained in good yield.

In the same manner, are obtained the ferric salts of the products of Table I, Example V and Table III, Example VII.

EXAMPLE XI

The magnesium salt of 2-vinylpyromeconic acid is obtained by adding 0.01 mole of magnesium hydroxide, Mg(OH)$_2$, to a solution of 0.02 mole of the compound in 100 ml. of water. The mixture is heated to 80° C. with stirring and is filtered hot to remove insoluble impurities. The filtrate is freeze-dried to give the magnesium salt in good yield.

The aluminum salt of 2-vinylpyromeconic acid is obtained by replacing magnesium hydroxide with aluminum isopropoxide in the procedure described above. The calcium salt is obtained by replacing magnesium hydroxide with calcium hydroxide.

In a similar manner, the magnesium, aluminum, calcium and ammonium salts of the products of Table I, Example V and Table III, Example VII, are prepared.

What is claimed is:

1. The method of inhibiting the growth of bacteria and fungi which comprises applying to the locus thereof an inhibiting concentration of a compound selected from the group consisting of those having the formulae:

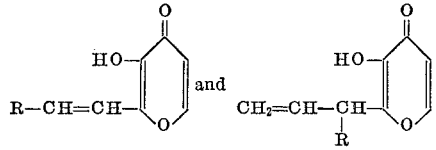

where R is hydrogen or alkyl having from 1 to about 6 carbon atoms; or the pharmaceutically acceptable alkali addition salts thereof.

2. The method of claim 1 wherein said inhibiting concentration is from about 2 to about 10,000 parts per million by weight.

3. The method of claim 1 wherein R is hydrogen.

4. An antibacterial and antifungal composition comprising an effective amount of a compound selected from the group consisting of those having the formulae:

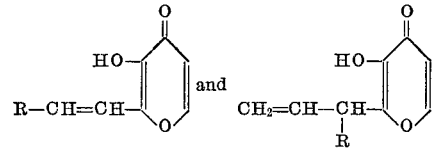

where R is hydrogen or alkyl having from 1 to about 6 carbon atoms; or the pharmaceutically acceptable alkali addition salts thereof, and a carrier.

5. The composition of claim 4 wherein said compound is 2-vinylpyromeconic acid.

References Cited

UNITED STATES PATENTS 2,417,584   3/1947   Birkinshaw et al. ____ 424—283
3,130,204   4/1964   Tate et al. _____ 260—345.9

ALBERT T. MEYERS, Primary Examiner

D. M. STEPHENS, Assistant Examiner

U.S. Cl. X.R.

252—122